United States Patent
Baker et al.

(10) Patent No.: US 7,310,089 B2
(45) Date of Patent: Dec. 18, 2007

(54) ANNULAR POTENTIOMETRIC TOUCH SENSOR

(75) Inventors: Jeffrey R. Baker, Thousand Oaks, CA (US); Carlos S. Sanchez, Oxnard, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 330 days.

(21) Appl. No.: 11/129,805

(22) Filed: May 16, 2005

(65) Prior Publication Data

US 2005/0259085 A1 Nov. 24, 2005

Related U.S. Application Data

(60) Provisional application No. 60/572,155, filed on May 18, 2004.

(51) Int. Cl.
G06F 3/041 (2006.01)
G06F 3/045 (2006.01)

(52) U.S. Cl. .................................... 345/173; 178/18.05

(58) Field of Classification Search ............... 345/156, 345/157, 159, 173–175, 177, 178, 184; 178/18.01, 178/18.03, 18.05, 18.07, 18.08
See application file for complete search history.

(56) References Cited

U.S. PATENT DOCUMENTS

| | | | |
|---|---|---|---|
| 4,264,903 A * | 4/1981 | Bigelow ....................... 341/1 |
| 4,482,883 A | 11/1984 | Heredero |
| 4,494,105 A | 1/1985 | House |
| 4,719,524 A * | 1/1988 | Morishima et al. ...... 360/73.05 |
| 4,736,191 A * | 4/1988 | Matzke et al. ................. 341/20 |
| 4,777,328 A * | 10/1988 | Talmage et al. ......... 178/18.05 |
| 5,151,677 A | 9/1992 | Gernet et al. |
| 5,159,159 A * | 10/1992 | Asher ....................... 178/18.05 |
| 5,353,004 A | 10/1994 | Takemoto et al. |
| 5,889,236 A * | 3/1999 | Gillespie et al. ......... 178/18.01 |
| 5,923,388 A * | 7/1999 | Kurashima et al. ........... 349/23 |
| 5,952,912 A | 9/1999 | Bauer et al. |
| 7,046,230 B2 * | 5/2006 | Zadesky et al. ............. 345/156 |
| 2004/0224638 A1 * | 11/2004 | Fadell et al. ............... 455/66.1 |
| 2004/0252109 A1 * | 12/2004 | Trent et al. .................. 345/174 |
| 2005/0052425 A1 * | 3/2005 | Zadesky et al. ............. 345/173 |
| 2005/0110768 A1 * | 5/2005 | Marriott et al. ............. 345/173 |

* cited by examiner

*Primary Examiner*—Jeff Piziali
(74) *Attorney, Agent, or Firm*—Brooks Kushman P.C.

(57) ABSTRACT

The present invention determines angular position using a potentiometric touch sensor. The sensor has an annular pattern of resistive material on a bottom substrate top surface. Conductive drive lines radially traverse the resistive material so as to make electrical connection with the resistive material. A top substrate is spaced above the top surface of the bottom substrate. A conductive sense layer on a bottom surface of the top substrate is positioned above the resistive material. Pressure applied to either the top substrate or the bottom substrate, such as by the touch of a user, causes a portion of the conductive sense layer to contact a corresponding portion of the annular pattern of resistive material. The angular position of the applied pressure can be determined by measuring at least one electrical parameter between at least one of the conductive drive lines and the conductive sense layer.

15 Claims, 8 Drawing Sheets

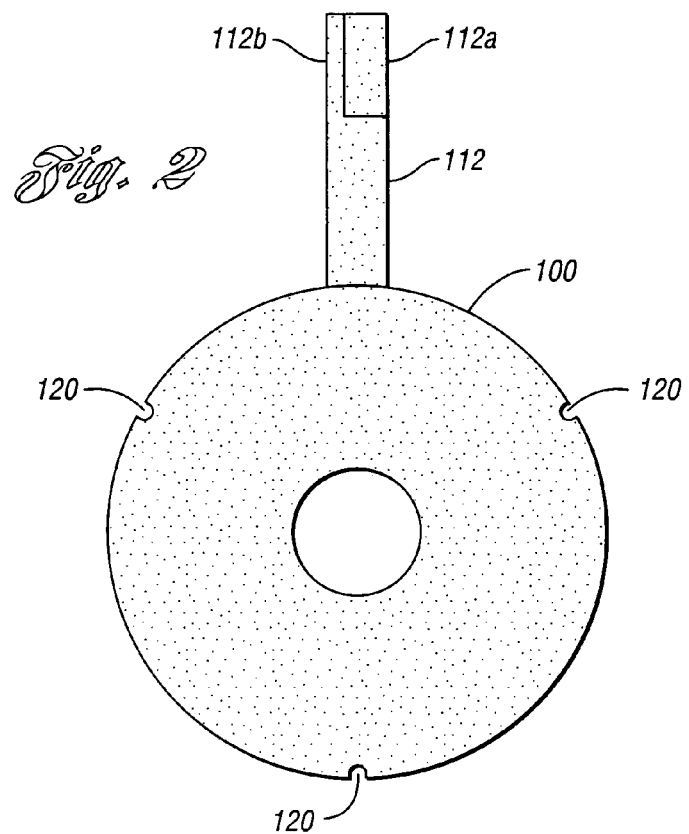
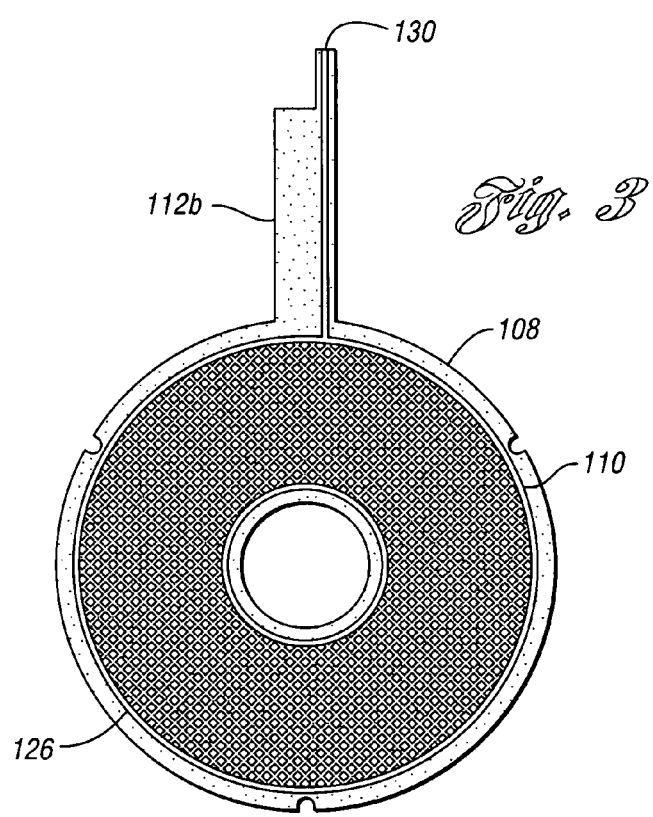

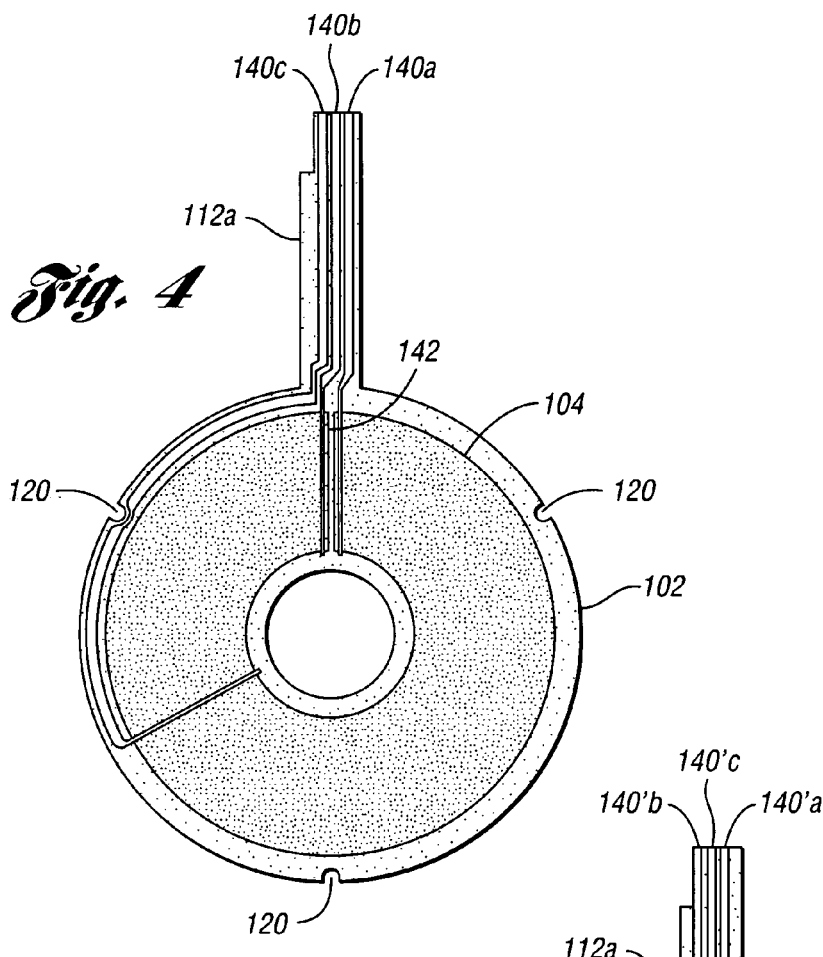
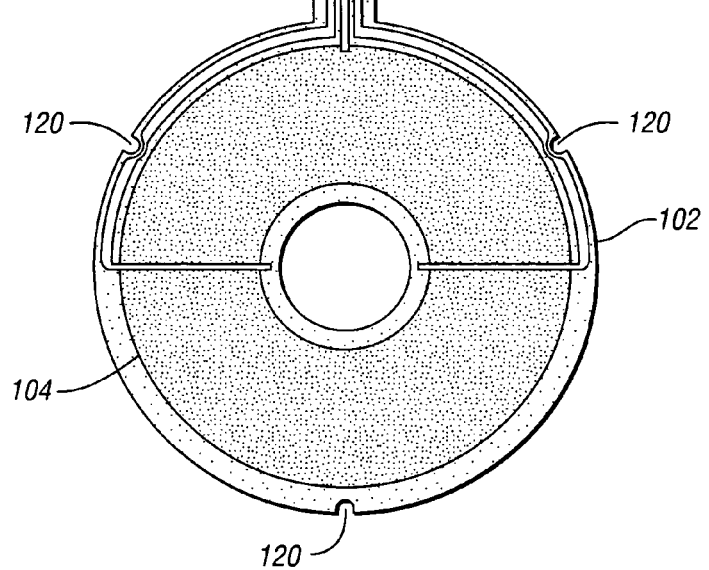

ANNULAR POTENTIOMETRIC TOUCH SENSOR

CROSS-REFERENCE TO RELATED APPLICATIONS

This application claims the benefit of the U.S. provisional application Ser. No. 60/572,155, filed May 18, 2004.

BACKGROUND OF THE INVENTION

1. Field of the Invention

The present invention relates to angular position sensors typically used as an input device for electronics having a graphical user interface.

2. Background Art

Angular input sensors, known as scroll wheels, scroll rings, jog wheels and the like, are intuitive input devices often used with a graphical user interface (GUI) for choosing between items that can be arrayed in some sense one-dimensionally, such as a list, or arrayed circularly, such as a list that wraps around. Selectable options or choices may be discrete, such as channels on a TV, or continuous, such as audio volume. Scroll wheels often consist of a flat disk or wheel. In use, a user touches the face or edge of the disk and rotates the disk in order to manipulate choices in the GUI.

Angular input sensors can be constructed as a touch sensitive annular surface. One example is the Apple iPod, a portable music player. A ring-shaped capacitive sensor on the face of the iPod reports the angular position of a finger touch, which in turn is used to manipulate menus on an LCD display.

To be useful in hand-held portable electronics, such angular sensors must meet severe space and power consumption requirements. Ideally, the sensor is measurable by a small microcontroller. To conserve scarce battery power the sensor should be compatible with waking the microcontroller from a low power sleep mode by a user's touch, as opposed to requiring the microcontroller to frequently wake and actively check for a touch. Angular sensors should be inexpensive, easy to manufacture and easily manufactured into an end product. Preferably, the design should be adaptable into a variety of shapes besides a simple circular ring.

SUMMARY OF THE INVENTION

The present invention determines angular position using a potentiometric touch sensor.

An annular touch sensor is provided. The sensor has an annular pattern of resistive material on a bottom substrate top surface. Conductive drive lines radially traverse the resistive material so as to make electrical connection with the resistive material. A top substrate is spaced above the top surface of the bottom substrate. A conductive sense layer on a bottom surface of the top substrate is positioned above the resistive material.

Pressure applied to either the top substrate or the bottom substrate, such as by the touch of a user, causes a portion of the conductive sense layer to contact a corresponding portion of the annular pattern of resistive material. The angular position of the applied pressure can be determined by measuring at least one electrical parameter between at least one of the conductive drive lines and the conductive sense layer.

Two drive lines may be used. In one embodiment, the drive lines are located in close proximity on the annular pattern of resistive material. In another embodiment, the two drive lines are located at opposing sides of the annular pattern of resistive material. The sensor may also include a third conductive tie breaker trace. Alternatively, three drive lines may be used. In one embodiment, these drive lines are equally spaced about the annular pattern of resistive material.

In yet another embodiment of the present invention, an adhesive spacer layer between the bottom substrate and the top substrate adheres the bottom substrate to the top substrate in a spaced apart manner. A rear adhesive on a bottom surface of the bottom substrate may be used to attach the sensor to a host device. In addition, an outer protective layer may be adhered to a top surface of the top sensor layer.

In still another embodiment, the annular touch sensor includes a processor in electrical communication with the conductive drive lines and the conductive sense layer. The processor measures a first voltage between the conductive sense layer and a first conductive drive line and measures a second voltage between the conductive sense layer and a second conductive drive line. An angular position of applied pressure about the annular touch sensor is determined based on the first measured voltage and the second measured voltage. The processor may also measure a third voltage between the conductive sense layer and a third conductive trace in electrical communication with the annular pattern of resistive material. The angular position of applied pressure may then be additionally based on the third measured voltage.

A method of determining angular position on a touch sensor is also provided. A first test voltage is applied between a first conductive trace intersecting an annular pattern of resistive material and a second conductive trace intersecting the annular pattern of resistive material. A first measured voltage is determined between the first conductive trace and a conductive sense layer brought into contact with the resistive material by pressure applied at the angular position to be determined. A second test voltage is applied between the second conductive trace and the first conductive trace. A second measured voltage is determined between the second conductive trace and the conductive sense layer. The angular position is determined based on the first measured voltage and the second measured voltage.

In an embodiment of the present invention, the method further includes applying a third test voltage to a third conductive trace intersecting the resistive material. A third measured voltage is determined between the conductive sense layer and either the first conductive trace or the second conductive trace. The angular position is determined based additionally on the third measured voltage. The use of either the first conductive trace or the second conductive trace in determining the third measured voltage may be based on at least one of the first measured voltage and the second measured voltage.

Another method of determining angular position on a touch sensor is also provided. At least one first test voltage is applied between a first conductive trace intersecting an annular pattern of resistive material and a second conductive trace intersecting the resistive material. At least one first measured voltage is determined between a conductive sense layer and at least one of the first conductive trace and the second conductive trace. The angular position is determined based on the first measured voltage. If the angular position is nearer to the first conductive trace than to either of the second conductive trace or a third conductive trace intersecting the resistive material, at least one second test voltage is applied between the second conductive trace and the third conductive trace. The angular position is then determined based on the second measured voltage. If the angular position is nearer to the second conductive trace than to either of the first conductive trace or the third conductive trace, at least one third test voltage is applied between the first conductive trace and the third conductive trace. The angular position is then determined based on the at least one third measured voltage.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 2 is a top view drawing of a sensor according to an embodiment of the present invention;

FIG. 3 is a bottom view of a top substrate according to an embodiment of the present invention;

FIG. 4 is a top view of a bottom substrate having two closely spaced conductive traces according to an embodiment of the present invention;

FIG. 5 is a top view of a bottom substrate having two widely spaced conductive traces according to an embodiment of the present invention;

DETAILED DESCRIPTION OF THE PREFERRED EMBODIMENT(S)

Figure 1:
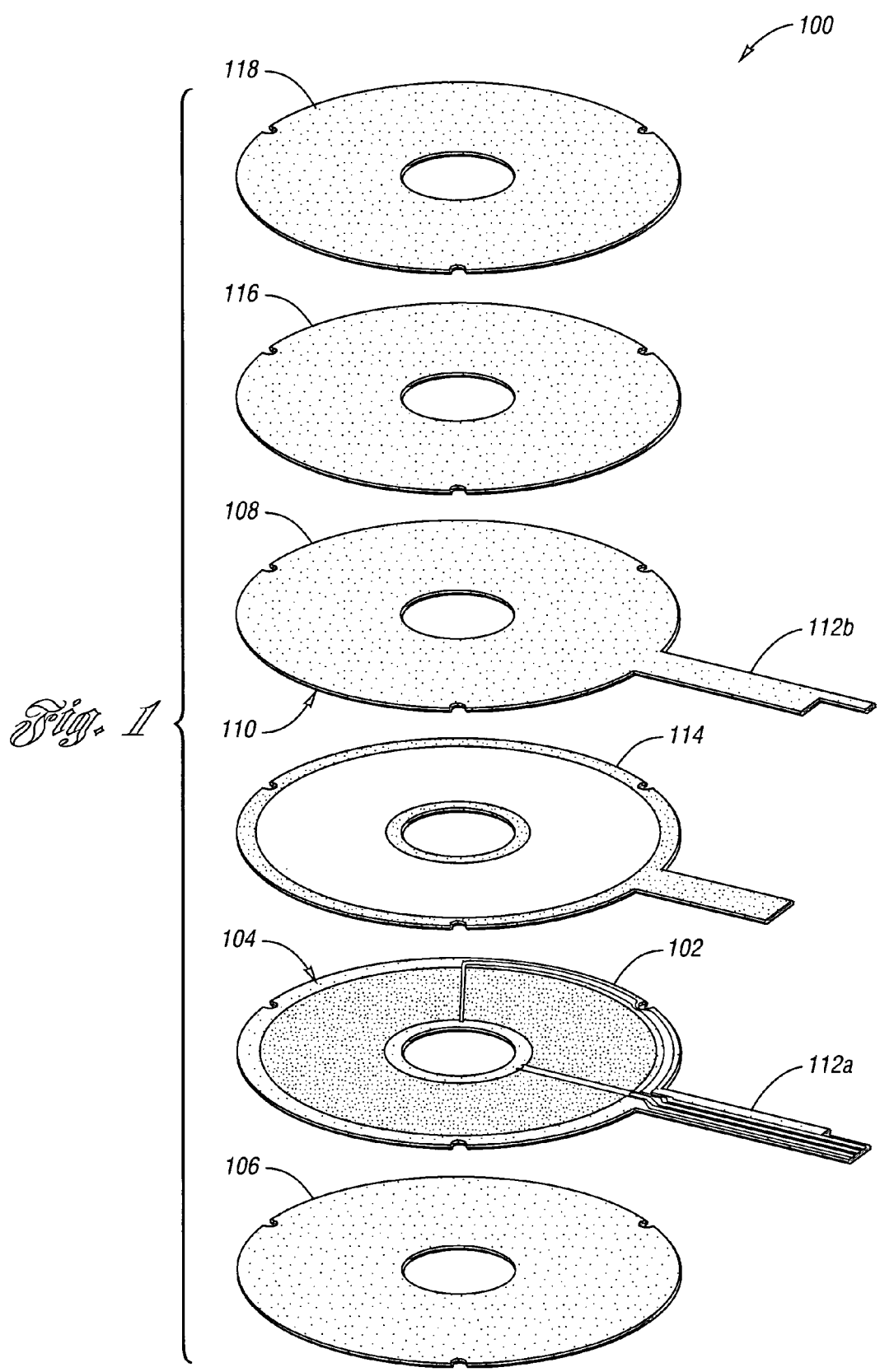
FIG. 1 is an exploded view drawing of a sensor according to an embodiment of the present invention.

Referring to FIG. 1, an exploded view drawing of a sensor 100 according to an embodiment of the present invention is shown. The sensor 100 is a planar annulus potentiometric sensor 100 for determining the angular location of a touch. The sensor 100 is "planar" in the sense that while it may be many tens of millimeters across, it is only approximately 0.5 mm thick. The sensor 100 is annular since it may comprise a ring or a partial arc of a ring. The sensor 100 is "potentiometric" in that it contains a resistive element across which a potential is placed and a sense element that contacts the resistive element such that the voltage seen by the sense element is proportional to the location of the contact. The sensor 100 is a "touch" sensor in that its size and operational force range are suitable for the detection of light human finger force.

Preferred embodiments have essential layers. A bottom substrate 102, which may be flexible or rigid, is deposited on its inside or top surface with an annular resistive material 104. Two or more highly conductive drive lines (not shown) intersect the resistive material 104, preferably traversing the resistor element. The resistive material 104 may be polymer thick film carbon ink that is screen printed in place. The highly conductive material may be polymer thick film silver ink.

A flexible top substrate 108 is deposited on its inside or bottom surface with a conductive sense layer 110. This sense layer 110 is analogous to the wiper of a mechanical potentiometer. The sense layer 110 may be a solid pattern or meshed with a grid pattern. The sense layer 110 is typically a silver polymer thick film, but may be carbon or other conductive or semiconductive material.

The bottom substrate 102 and the flexible top substrate 108 are held together at the inner and outer radii of the annulus by an adhesive spacer layer 114. The spacer layer 114 is thick enough to prevent the inner faces of the top 108 and bottom 102 substrates from contacting except when the flexible top substrate 108 or bottom substrate 102 is touched by a user (not shown).

The bottom substrate 102 may include a bottom pigtail extension 112a and top substrate 108 may include a top pigtail extension 112b. Each pigtail extension 112 may include electrical traces (not shown) for making electrical contact with drive lines, the sense layer 110 and other elements of the sensor 100 as will be further described below. The ends of the pigtail extensions 112 may include a connector or the pigtails 112 may be directly inserted into a connector as is known in the art. Other schemes for making electrical connections with the sensor 100 are also possible.

The sensor 100 may include a rear or bottom adhesive 106 for attaching the sensor 100 to a host device (not shown) such as a printed circuit board. The sensor 100 may also include a top adhesive layer 116 onto which is attached a top protective layer 118. The top protective layer 118 may be printed with a specific color, pattern, logo or the like.

The description of the present invention uses spatial references such as top and bottom for clarity only. The sensor 100 may be used in any orientation. Further, while the sensor 100 is generally described as operating with a touch on the top substrate 108 pushing the top substrate 108 onto the bottom substrate 102, the sensor 100 will also operate with a touch on the bottom substrate 102 pushing the bottom substrate 102 into contact with the top substrate 108.

Referring now to FIG. 2, a top view drawing of a sensor 100 according to an embodiment of the present invention is shown. The three notches 120 are for alignment with the host device. The tail 112 is for connection of the sensor 100 to the circuit of the host device. To simplify construction of the sensor 100, part of the tail 112 is the bottom pigtail 112a built from the bottom layer 102 and has conductors that face upwards. The other part of the tail 112 is the top pigtail 112b built from the top layer 108 and has conductors facing downward.

Referring now to FIG. 3, a bottom view of a top substrate 108 according to an embodiment of the present invention is shown. The fine grid of highly conductive traces 126 forms the sense layer 110 that is pushed against the resistive ring 104 when the sensor 100 is touched. A single connection 130 to this layer extends down the top pigtail 112b.

Referring now to FIG. 4, a top view of a bottom substrate 102 having two closely spaced conductive traces (140a-140b) according to an embodiment of the present invention is shown. This embodiment has a gap 142 in the resistor ring 104 and three conductive lines (140a-140c). The two drive lines (140a-140b) near the gap 142 are used to set up an electrical potential around the ring 104. The third line 140c is a tie breaker, the operation of which will be described in greater detail below. Conductive traces 140 for the drive lines (140a-140b) and tie breaker 140c extend down the bottom pigtail 112a.

Referring now to FIG. 5, a top view of a bottom substrate 102 having two widely spaced conductive traces (140'a-140'b) according to an embodiment of the present invention is shown. This embodiment has a continuous ring of resistive material 104 with two drive lines (140'a-140'b) located opposite each other on the ring 104. A tie breaker conductive trace 140'c intersects the resistive ring 104 at the top of the ring 104. Conductive traces 140' for the drive lines (140'a-140'b) and tie breaker 140'c extend down the bottom pigtail 112a.

Figure 6:
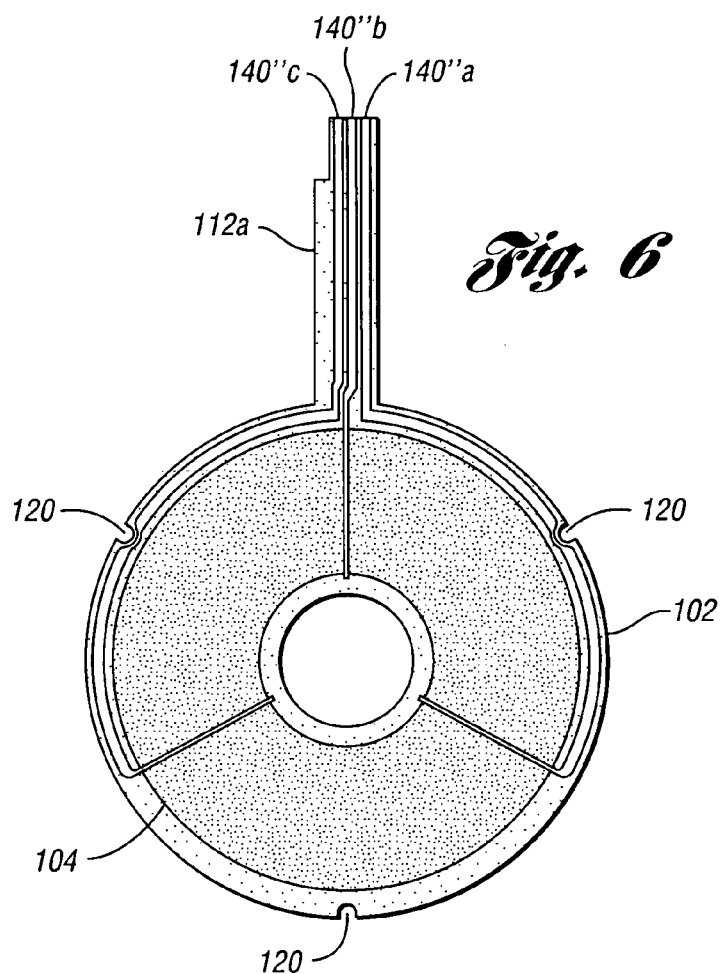
FIG. 6 is a top view of a bottom substrate having three conductive traces according to an embodiment of the present invention.

Referring now to FIG. 6, a top view of a bottom substrate 102 having three conductive traces 140" according to an embodiment of the present invention is shown. This embodiment has three drive lines (140"a-140"c) spaced at 120° intervals around the resistive ring 104. Conductive traces 140" for the drive lines (140"a-140"c) extend down the bottom pigtail 112a.

Figure 7A:
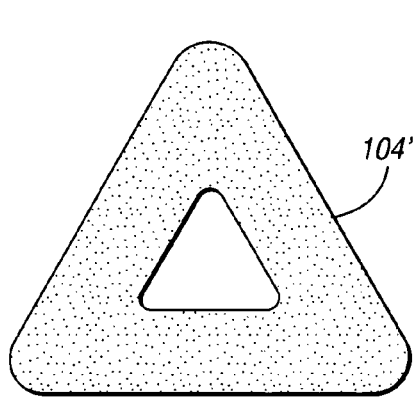
FIGS. 7a-7e are schematic diagrams of annular patterns of resistive material according to embodiments of the present invention.
Figure 7B:
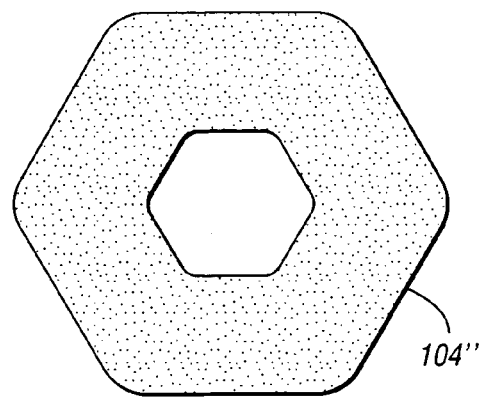
Figure 7C:
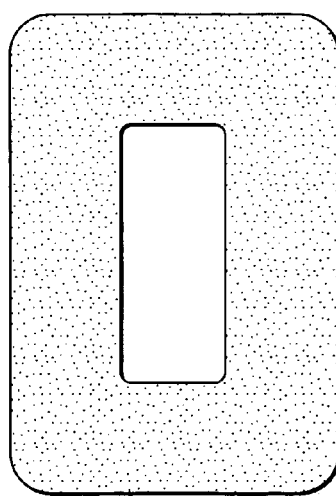
Figure 7D:
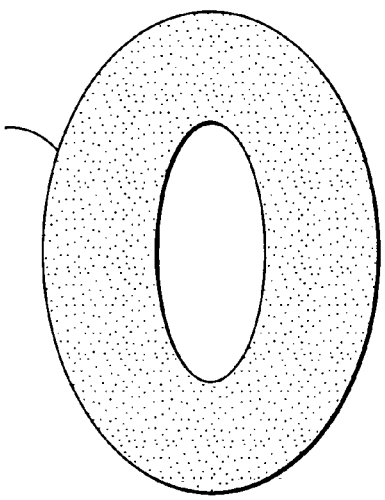
Figure 7E:
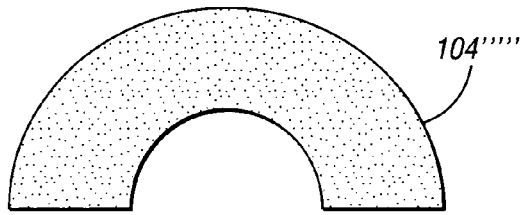

Referring now to FIGS. 7a-7e, schematic diagrams of annular patterns of resistive material (104'-104""') according to embodiments of the present invention are shown. In addition to a round or circular pattern of resistive material 104, a wide variety of annular shapes may be used. FIG. 7a illustrates a triangular annular region 104'. FIG. 7b illustrates a hexagonal annular region 104". FIG. 7c illustrates a rectangular annular region 104"'. FIG. 7d illustrates an ovoid annular region 104"". FIG. 7e illustrates a semicircular annular region 104""'. As will be recognized by one of ordinary skill in the art, a wide variety of resistive patterns may be used with the present invention.

Figure 8:
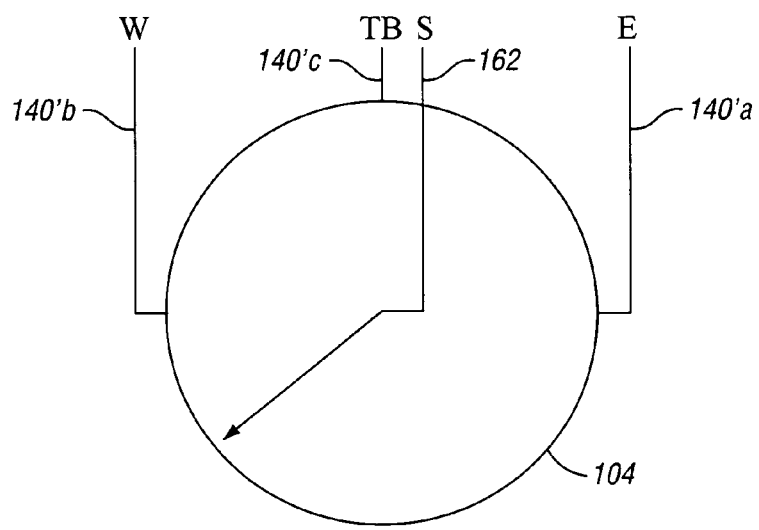
FIG. 8 is a schematic diagram of a sensor including two conductive traces and a tie-breaker trace according to an embodiment of the present invention.

Referring now to FIG. 8, a schematic diagram 160 of a sensor 100 including two conductive traces (140'a-140'b) and a tie breaker trace 140'c according to an embodiment of the present invention is shown. The circle represents an annulus of resistive material 104. The three drive lines 140' are labeled "W" for West, "E" for East and "TB for Tie Breaker. The sense line 162 is labeled "S."

Locating the East 140'a and West 140'b drive lines 180° apart allows the use of an annular resistive region 104 without a gap 142 in the middle. This helps to prevent ambiguous and misleading voltages that would be present on the sense line 162 when the user's finger bridged this small gap 142. Separating the East 140'a and West 140'b drive lines by 180° introduces the problem that now an algorithm cannot distinguish between North and South halves of the annular region 104. This is addressed by the Tie Breaker line 140'c. Bringing the Tie Breaker line 140'c either high or low and taking a second reading on the sense line 162 gives an indication of which half of the sensor 100 is being touched.

This sensor 100 is basically two conductive or partially conductive membranes separated by a narrow gap. Rapid transition of the drive lines 140' could capacitively couple voltages onto the sense line 162 even when the sensor 100 is untouched. This problem may be fixed by switching the sense line 162 to output low while the drive lines 140' are transitioning, then switching the sense line 162 to being an analog-to-digital converter (ADC) input after the lines 140' have settled. Alternatively, an additional general purpose I/O "drain" line (not shown) may be used. As the drive lines 140' are being configured for a measurement, the drain can be used to hold the sense line 162 low. Then just before the ADC reading, the drain line can be switched to a high-impedance input state, effectively removing it from the circuit.

Figure 9:
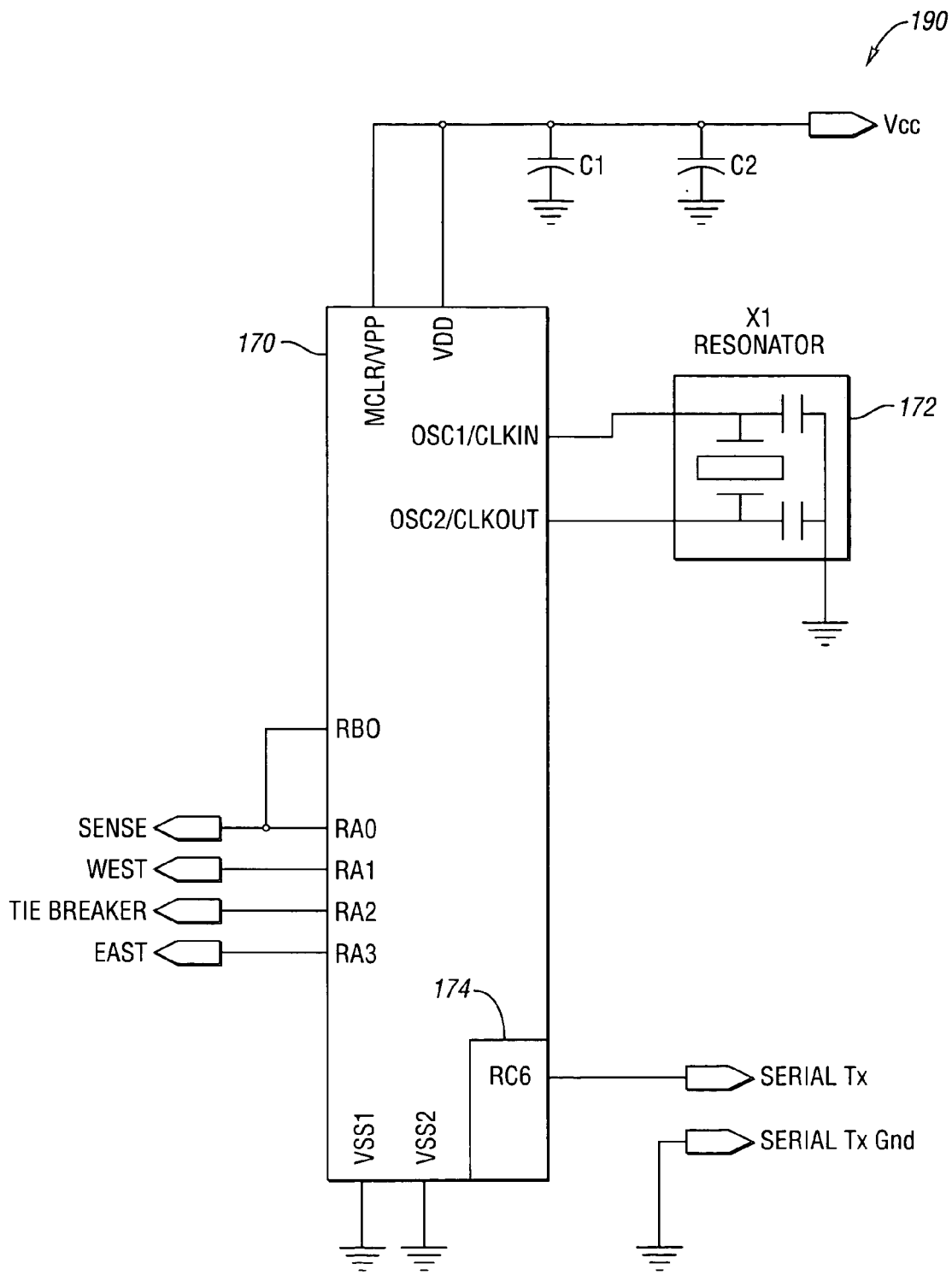
FIG. 9 is a schematic diagram of a processor according to an embodiment of the present invention.

Referring now to FIG. 9, a schematic diagram 190 of a processor 170 according to an embodiment of the present invention is shown. Logic may be implemented in a microprocessor for determining the touch location. The system 190 may include clock circuitry 172, serial communication circuitry 174, and the like as is commonly used with microcontrollers. In the embodiment shown, the microcomputer includes on analog-to-digital converter (ADC) input line (i.e., RA0) for the sense line. Either the ADC line is capable of driving current or a separate drain, shown in FIG. 9 as pin RB0, may be used. The drain line (RB0) is configurable as a high-impedance input so that it may be effectively removed from the circuit. In addition, three lines (i.e., RA1-RA3) are used for driving the West, Tie Breaker and East lines. Each of these is configurable independently as output high, output low or high-impedance input.

Figure 10:
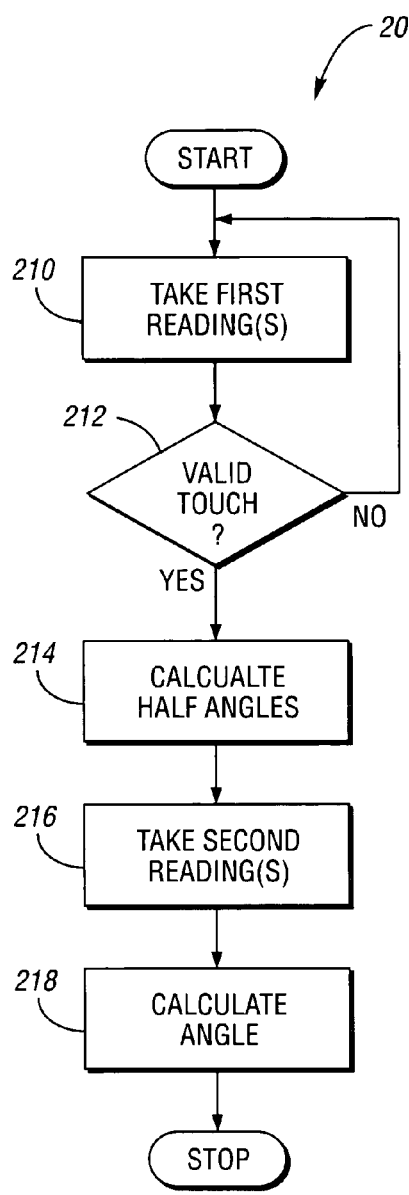
FIG. 10 is a flow diagram of a method for calculating angular position of pressure applied to a sensor with two conductive traces and a tie-breaker trace according to an embodiment of the present invention.

Referring now to FIG. 10, a flow diagram 200 of a method for calculating angular position of pressure applied to a sensor (e.g., 100) with two conductive traces (e.g., 140'a-140'b) and a tie-breaker trace (e.g., 140'c) according to an embodiment of the present invention is shown. As will be appreciated by one of ordinary skill in the art, the operations illustrated in the flow diagram 200 are not necessarily sequential operations. The order of steps may be modified within the spirit and scope of the present invention. The present invention transcends any particular implementation and the embodiment is shown in sequential flow chart form for ease of illustration. In the following discussion, an 8-bit ADC is assumed. The far east edge is assigned an angle of zero conversion counts and the far west edge is assigned an angle of 255 counts. A full 360° is then represented by 510 counts.

At least one first reading is taken from the sense line (e.g., 162) (step 210). In one embodiment, two first readings are taken. Initially, the drain pin (e.g., RB0) is configured as an output and set to low. The Tie Breaker line (e.g., 140'c) is configured as a high impedance input. The West line (e.g., 140'b) is configured as Vcc (e.g., 5 VDC) and the East line (e.g., 140'a) as ground or reference. The drain pin is then set to high impedance. A delay, such as 20 µs, may be introduced for settling, ADC sampling capacitor charging, and the like. The sense line is then measured by the ADC. This measurement may be referred to as Vew, or the sense voltage with a test voltage applied from East to West.

A second first reading may then be taken by again configuring the drain pin as a low output and the Tie Breaker line as a high impedance input. The East line is set to Vcc and the West line is set to ground. The drain pin is configured as a high impedance input. After a delay, the sense line is measured by the ADC. This measurement may be referred to as Vwe.

A check is made to determine if the touch is valid (decision block 212). Because any ADC reading on the sense line, whether the sensor is being touched or not, will give a result between 0 and 255 inclusive for an 8-bit output, the system must differentiate between an untouched condition and a condition where the sensor is touched exactly at the East or West edge. This may be accomplished by measuring twice in rapid succession, with the drive lines reversed in polarity. Since it is not possible for a user to touch the exact East edge and then the exact West edge within the short measurement window, if both measurements result in zero (or very low) ADC count, the sensor must be untouched.

Alternatively, or in addition to the previous check, the drain line could be configures to function as a "wake on change" line, allowing the controller (e.g., 170) to wake from sleep when a user touches the sensor. In microcontrollers from Microchip, this may be accomplished with pin RB0. This pin also has an internal pull-up resistor that can conveniently be switched on and off. Other "wake on touch" strategies are possible, as is known in the art.

If the touch is valid (YES leg of block 212), half angles are calculated (step 214). The half angle is the touch position on the sensor resolved to either the top (North) or bottom (South) half between the East and West lines. The half angle may be calculated based on one or both of the first readings.

One or more second readings may be taken to resolve whether or not the touch is in the top or bottom half (step 216). In one embodiment, two second readings are obtained. For the first second reading, the drain pin is configured as an output and set low. The Tie Breaker line is set as an output. If Vew is greater than half scale, the Tie Breaker line is set low (e.g., ground), otherwise the Tie Breaker is set high (e.g., Vcc). This will ensure the maximum discriminating power for the sense measurement. The West line is set to Vcc and the East line to ground. The drain pin is configured as a high impedance input. After a delay, the sense line is measured by the ADC. This measurement may be referred to as Vwe_tb.

The next second reading, the drain pin is configured as a low output and the Tie Breaker line is set as an output. If Vwe is greater than half scale, the Tie Breaker line is set low, otherwise the Tie Breaker line is set high. This will ensure the maximum discriminating power for the sense measurement. The East line is set to Vcc and the West pin is set to ground. The drain pin is configured as a high impedance input. After a delay, the sense line is measured by the ADC. This measurement may be referred to as Vew_tb. The angle may then be calculated. The touch position is completely determined using at least one of the second readings.

Processing the first and second readings may be accomplished within the processor, as disclosed in the following exemplary algorithm. First, a determination is made as to whether or not the sensor is being touched. If both Vew and Vwe are zero, then the sensor is not touched:

```
If ((0 = = Vew) & (0 = = Vwe))
{
    Sensor is not touched!
}
```

Noise may be taken into account by using a threshold of one or two ADC counts, as follows:

```
If ((Vew < = 2) & (Vwe < = 2))
{
    Sensor is not touched!
}
```

Also, it is possible that the sensor is touched or released in mid-measurement. This condition can be captured by sanity checking Vwe and Vew against each other, as follows:

```
If (abs(Vew − 255 + Vwe) > 2)
{
    Reading is nonsense!
}
```

Next the angle is calculated (step 218). First, the touch position between East and West is calculated, regardless of which half (North or South) is being touched. To do this, the two polarity-reversed readings are averaged:

theta=(*Vwe*+255−*Vew*)/2;

Then, the differences between the readings with and without the Tie Breaker indicate whether the touch was in the North or South halves:

```
Vdiff = abs(Vew − Vew_tb) + abs (Vwe − −Vwe_tb);
If (Vdiff > 2)
{
    theta = 510 − theta
}
```

The final result is a number between zero and 510 corresponding to angle between 0° and 360°. If multiple measurements are summed, then the maximum angle is correspondingly higher. For example, if four measurements are summed, the max angle is 2040.

Figure 11:
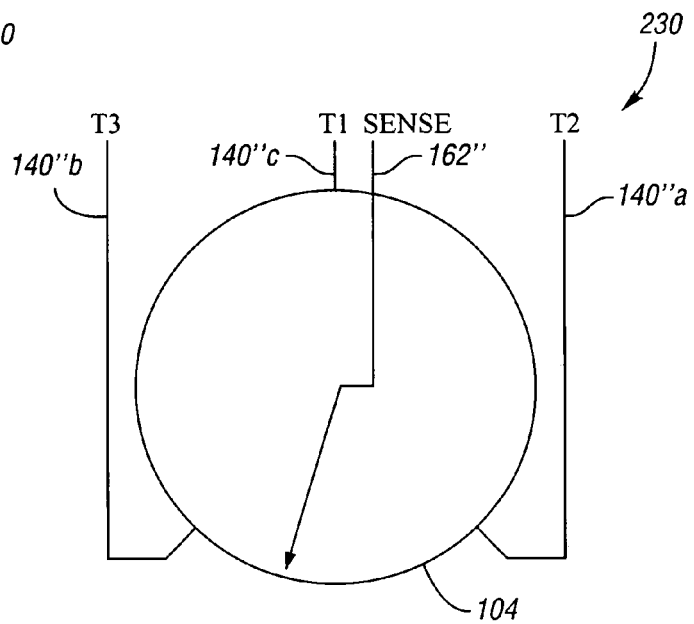
FIG. 11 is a schematic diagram of a sensor including three conductive traces according to an embodiment of the present invention.

Referring now to FIG. 11, a schematic diagram 230 of a sensor 100 including three conductive traces (140") according to an embodiment of the present invention is shown. As with the two-legged version (e.g., FIG. 8), this is a four wire device. The circle represents the annular resistive region 104. In the embodiment shown, the drive lines 140" are separated by 120° of arc.

The two-legged sensor described with regard to FIG. 8 has a problem near 3 o'clock and 9 o'clock, where the drive lines (140'*a*-140'*b*) lie. When a slightest portion of the sense layer 110 is pressed against either of these drive lines (140'*a*-140'*b*), as happens when the touch point is within about five degrees, the touch point appears be exactly at the drive line (140'*a*-140'*b*). From a user's perspective the result is small dead zone near the drive lines (140'*a*-140'*b*). One method for eliminating this result is to use three drive lines (140"*a*-140"*c*) as schematically shown in FIG. 11.

Providing three drive lines 140" permits choosing two of the three to use at any one time. By choosing to use the two lines furthest from the touch point, the touch point calculation can avoid the situation wherein the touch brings the sense layer 110 into contact with an active drive line. This avoids the dead zone problem.

Figure 12:
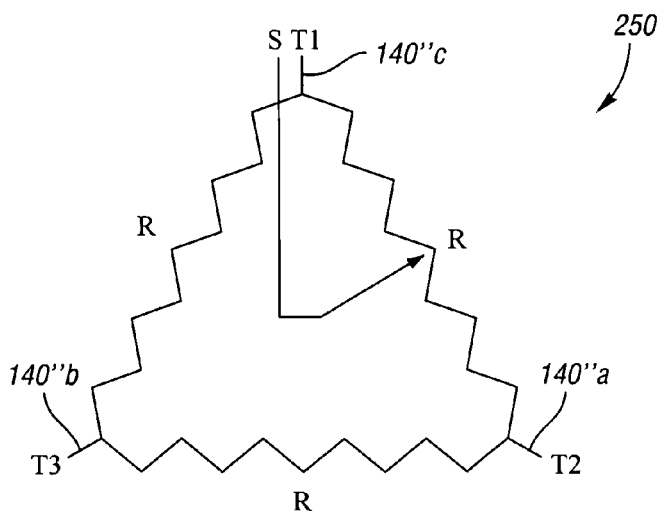
FIG. 12 is a schematic diagram of a resistor model for the senor of FIG. 11.

Referring now to FIG. 12, a schematic diagram of a resistor model 250 for the sensor 100 of FIG. 11 is shown. The annular resistive region 104 is illustrated as resistors connected at terminals labeled T1, T2, and T3. The resistance between any two adjacent terminals is defined as R. The touch point is indicated by an arrow.

Figure 13:
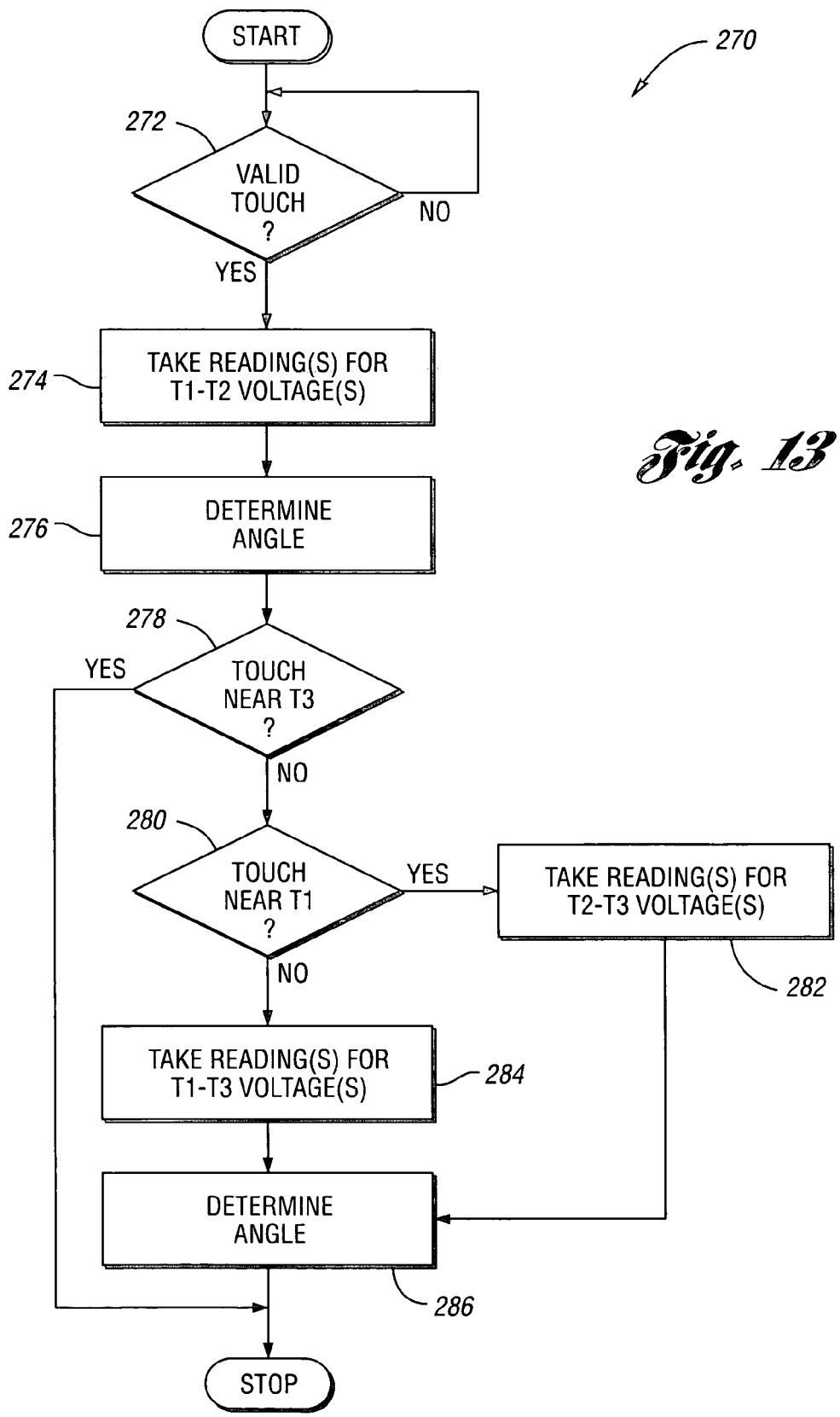
FIG. 13 is a flow diagram of a method for calculating angular position of pressure applied to a sensor with three conductive traces according to an embodiment of the present invention.

Referring now to FIG. 13, a flow diagram 270 of a method for calculating angular position of pressure applied to a sensor (e.g., 100) with three conductive traces (e.g., 140"*a*-140"*c*) according to an embodiment of the present invention is shown. As will be appreciated by one of ordinary skill in the art, the operations illustrated in the flow diagram 270 are not necessarily sequential operations. The order of steps may be modified within the spirit and scope of the present invention. The present invention transcends any particular implementation and the embodiment is shown in sequential flow chart form for ease of illustration.

A check is first made to determine if a valid touch has been received (decision block 272). This may be accomplished using a "wake on change" line, by examining two different voltage measurements in rapid succession, or similar method.

Once a valid touch is detected (YES leg of block 272), or as part of the valid touch detection, at least one sense line reading is made after applying at least one voltage between the T1 and T2 terminals (step 274). This reading may be accomplished in the same manner as described with regard to FIGS. 8-10 above. Terminal T3 may be used as a tie breaker. A touch angle is determined from this reading (step 276). If the touch is determined to be nearer T3 than either T1 or T2 (YES leg of decision block 278), the final angle is found.

If the touch angle is determined to be nearer T1 than to either T2 or T3 (YES leg of decision block 280), at least one sense line reading is made after applying at least one voltage between terminals T2 and T3 (step 282). T1 may be used as a tie breaker. If the touch angle is determined to be nearer T2 than to either T1 or T3 (NO leg of decision block 280), at least one sense line reading is made after applying at least one voltage between terminals T1 and T3 (step 284). T2 may be used as a tie breaker. These readings may be accomplished in the same manner as described with regard to FIGS. 8-10 above. The touch angle is then determined from the one or more readings (step 286).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An annular touch sensor comprising:
    a bottom substrate;
    an annular pattern of resistive material on a top surface of the bottom substrate;
    a plurality of conductive drive lines, each conductive drive line radially traversing the annular pattern of resistive material so as to make electrical connection with the annular pattern of resistive material;
    a top substrate spaced above the top surface of the bottom substrate; and
    a conductive sense layer on a bottom surface of the top substrate, the conductive sense layer positioned above the annular pattern of resistive material;
    whereby pressure applied to either the top substrate or the bottom substrate causes a portion of the conductive sense layer to contact a corresponding portion of the annular pattern of resistive material thus permitting the angular position of the applied pressure to be determined by measuring at least one electrical parameter between at least one of the conductive drive lines and the conductive sense layer.

2. The annular touch sensor of claim 1 wherein the plurality of conductive drive lines is two drive lines.

3. The annular touch sensor of claim 2 wherein the two drive lines are adjacent on the annular pattern of resistive material.

4. The annular touch sensor of claim 2 wherein the two drive lines are located at opposing sides of the annular pattern of resistive material.

5. The annular touch sensor of claim 2 further comprising a third conductive drive line tie breaker trace.

6. The annular touch sensor of claim 1 wherein the plurality of conductive drive lines is three drive lines spaced about the annular pattern of resistive material.

7. The annular touch sensor of claim 1 further comprising an adhesive spacer layer between the bottom substrate and the top substrate, the adhesive spacer layer adhering the bottom substrate to the top substrate in a spaced apart manner.

8. The annular touch sensor of claim 1 further comprising a rear adhesive on a bottom surface of the bottom substrate whereby the bottom substrate is attached to a host device.

9. The annular touch sensor of claim 1 further comprising an outer protective layer adhered to a top surface of the top substrate layer.

10. The annular touch sensor of claim 1 further comprising a processor in electrical communication with the plurality of conductive drive lines and the conductive sense layer, the processor operative to:
    measure a first voltage between the conductive sense layer and a first conductive drive line;
    measure a second voltage between the conductive sense layer and a second conductive drive line; and
    determine an angular position of applied pressure about the annular touch sensor based on the first measured voltage and the second measured voltage.

11. The annular touch sensor of claim 10 wherein the processor is further operative to measure a third voltage between the conductive sense layer and a third conductive trace in electrical communication with the annular pattern of resistive material and to determine the angular position of applied pressure about the annular touch sensor based additionally on the third measured voltage.

12. A method of determining angular position on a touch sensor comprising:
    applying a first test voltage between a first conductive trace intersecting an annular pattern of resistive material and a second conductive trace intersecting the annular pattern of resistive material;
    determining a first measured voltage between the first conductive trace and a conductive sense layer brought into contact with the annular pattern of resistive material by pressure applied at the angular position to be determined;
    applying a second test voltage between the second conductive trace and the first conductive trace;
    determining a second measured voltage between the second conductive trace and the conductive sense layer; and
    determining the angular position based on the first measured voltage and the second measured voltage.

13. The method of determining angular position on a touch sensor as in claim 12 further comprising:
    applying a third test voltage between the first conductive trace and a third conductive trace intersecting the annular pattern of resistive material;
    determining a third measured voltage between conductive sense layer and either the first conductive trace or the third conductive trace; and
    determining the angular position based additionally on the third measured voltage.

14. The method of determining angular position on a touch sensor as in claim 13 wherein the use of either the first conductive trace or the third conductive trace in determining the third measured voltage is based on at least one of the first measured voltage and the second measured voltage.

15. A method of determining angular position on a touch sensor comprising:
- applying a first test voltage between a first conductive trace intersecting an annular pattern of resistive material and a second conductive trace intersecting the annular pattern of resistive material;
- determining a first measured voltage between a conductive sense layer and either the first conductive trace or the second conductive trace, the conductive sense layer brought into contact with the annular pattern of resistive material by pressure applied at the angular position to be determined;
- applying a second test voltage between the first conductive trace and a third conductive trace intersecting the annular pattern of resistive material;
- determining a second measured voltage between the conductive sense layer and either the first conductive trace or the third conductive trace; and
- determining the angular position based on the first measured voltage and the second measured voltage.

\* \* \* \* \*